June 11, 1935.  R. W. RICHARDSON  2,004,799
PROCESS FOR PREPARING AMMONIUM SULPHITE OR BISULPHITE SOLUTIONS
Filed April 23, 1931
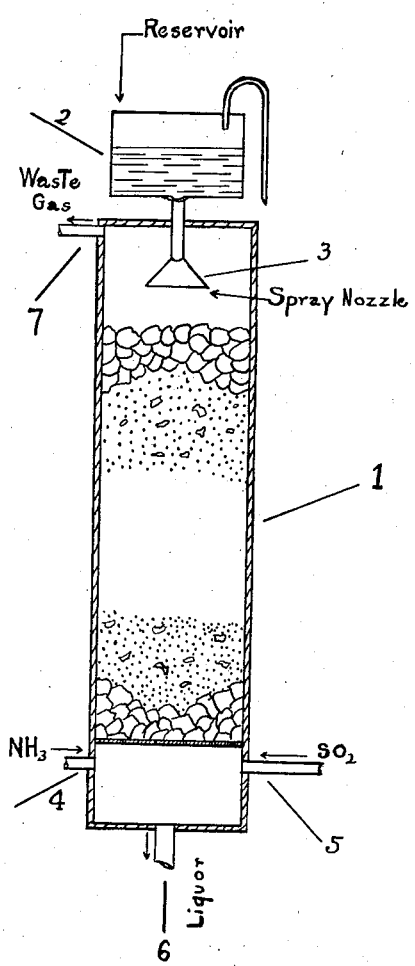
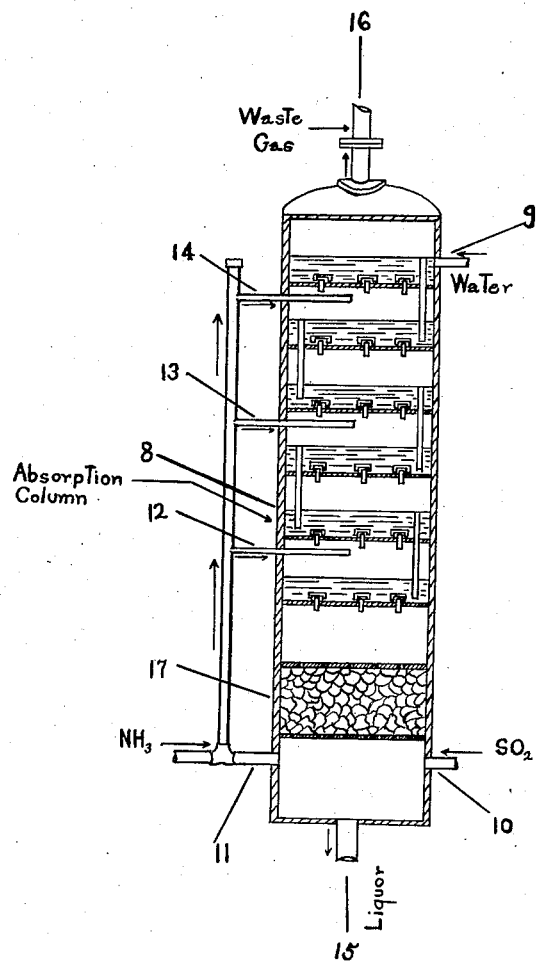
INVENTOR
Roger W. Richardson.
By His Attorney Patented June 11, 1935

2,004,799

UNITED STATES PATENT OFFICE 2,004,799

PROCESS FOR PREPARING AMMONIUM SULPHITE OR BISULPHITE SOLUTIONS

Roger W. Richardson, Wilmington, Del., assignor to E. I. du Pont de Nemours & Company, Wilmington, Del., a corporation of Delaware Application April 23, 1931, Serial No. 532,191

2 Claims. (Cl. 23—129)

This invention relates to the recovery of cellulose from vegetable fibrous materials such as wood, corn stalks, straw, bamboo, etc. and more particularly to the treatment of such materials with solutions containing ammonium sulphite or bisulphite.

In accordance with the invention I prepare solutions or liquors containing ammonium sulphite or bisulphite by causing an upwardly moving stream of gaseous sulphur dioxide to contact intimately with a falling stream or shower of relatively cool water in a suitable reaction vessel or tower, while introducing ammonia at one or more advantageous points in the tower. In this manner the ammonia reacts with the sulphur dioxide and water absorbs the resulting compound, the specific nature of which depends upon the relative proportions of the reactants. It may be that the water absorbs each gas separately and that the reaction occurs in the liquid phase, but this is immaterial insofar as the invention is not dependent upon any theory or explanation of the mechanism of the reaction.

In this manner I prepare solutions of ammonium sulphite or bisulphite, containing also other bases if desired, which are used in the treatment of vegetable fibrous material for the recovery of cellulose therefrom. The specific composition of the solutions as well as the conditions under which they are employed in the digestion of the fibrous materials may be varied widely, depending upon the character of the raw material used and the desired properties of the product.

Referring to the drawing, Figure 1 illustrates diagrammatically in section an arrangement of apparatus for the practice of one embodiment of the invention.

In the drawing (1) is a tower filled with inert packing, such as, for example, Raschig rings, into the top of which cold water is delivered from a reservoir (2) by way of a shower or spray nozzle (3). Gaseous ammonia and gaseous sulphur dioxide are introduced at the bottom of the tower thru the respective inlets (4) and (5). The relative rates of flow of gas and water are regulated so that the liquor withdrawn to (6) has the desired concentration of ammonium sulphite or bisulphite and preferably so that at the same time the waste gas escaping through (7) carries as little ammonia and sulphur dioxide as possible.

Referring to Figure 2, (8) is an absorption column of the bubbler type to which water is delivered by the inlet (9), gaseous $SO_2$ by way of conduit (10), and gaseous ammonia through the several pipes (11), (12), (13), and (14). By this arrangement for ammonia introduction at several points in the reaction system the control of composition of the liquor, as well as the temperature of the system, is facilitated. The liquor is withdrawn through (15) and waste gas through (16). Inert packing material disposed on the plate (17) facilitates distribution of the gas delivered at the bottom of the tower.

According to the preferred embodiment of the invention as practiced with the type of apparatus illustrated in Fig. 2, I employ liquid rather than gaseous ammonia, since the cooling effect produced by vaporization of liquid ammonia enables me to secure a lower temperature in the system with a consequent more efficient absorption of the reactants.

Aqua ammonia may also be used instead of liquid ammonia, but without the particular advantage characteristic of the latter.

It should be noted that in any case where the ammonia is introduced at a point other than the bottom of the tower the uppermost point of delivering should not be too near the top of the tower or ammonia gas will be carried away with the waste gas. The latter consists of excess air which is associated with the sulphur dioxide derived from sulphur burners of the usual type.

The general method hereinbefore described is also applicable to the case where it is desired to prepare the solution of mixed sulphites as, for example, sodium-ammonium sulphite. In this case the absorbing liquor instead of being water alone would be a solution of sodium hydroxide and the process would be otherwise operated as described. If, on the other hand, calcium ammonium sulphite or bisulphite is desired, the absorbing liquor may be milk of lime instead of water. Or also, the process may advantageously be operated in the general manner described with reference to Fig. 1, except that the tower is packed with limestone rather than an inert filler.

One or more reaction towers of the general character described may be employed; for example, several small towers rather than one large tower can be arranged in series, the absorbing liquid being delivered at one end of the series and the ammonia and sulphur dioxide at the other.

The liquors prepared in the general manner above described are withdrawn from the base of the absorption tower (or the last tower if several are used), and conveyed to the digester in which vegetable fibrous material is to be treated.

As examples of liquors which may advantageously be prepared in accordance with the invention and used in the processing, for example, of woods and other vegetable fibrous materials I mention the following:

An ammonium-bisulphite solution containing 0.7% ammonia, 4.8% SO₂, and the balance water;

An ammonium-lime-bisulphite solution containing 0.08% ammonia, 0.69% calcium, 4.8% SO₂, and the balance water;

The digestion is carried out in the usual manner at temperatures ranging upwards to, say, 150° C., the time of cooking varying with the character of the raw material undergoing treatment.

Various changes may be made in the method described without departing from the invention or sacrificing any of the advantages thereof.

I claim:

1. In the process of making ammonium sulphite or bisulphite solution the step which comprises contacting ammonia and sulphur dioxide with a falling shower of water while controlling the temperature and rate of absorption by introducing the ammonia at a plurality of levels and regulating the relative amounts thus introduced.

2. In the process of making ammonium sulphite or bisulphite solution the step of conveying gaseous sulphur dioxide countercurrent to a falling shower of water while adding liquid ammonia at a plurality of levels and controlling the rate and temperature of the absorption by varying the relative amounts of ammonia so added.

ROGER W. RICHARDSON.